United States Patent
Bodin et al.

(10) Patent No.: US 8,135,601 B2
(45) Date of Patent: Mar. 13, 2012

(54) ONE-WAY LIKE DISPLAY OF ROUNDTRIP FARES

(75) Inventors: Benoit Bodin, La Colle sur Loup (FR); Jorge Gomes, Nice (FR); Jean Mouyade, La Roquette sur Siagne (FR); Pierre Voute, Biot (FR); Nicolas Viard, Plan de Grasse (FR)

(73) Assignee: Amadeus s.a.s., Biot (FR)

( * ) Notice: Subject to any disclaimer, the term of this patent is extended or adjusted under 35 U.S.C. 154(b) by 122 days.

(21) Appl. No.: 12/302,075

(22) PCT Filed: Mar. 15, 2007

(86) PCT No.: PCT/EP2007/052468
§ 371 (c)(1),
(2), (4) Date: Sep. 16, 2009

(87) PCT Pub. No.: WO2007/134892
PCT Pub. Date: Nov. 29, 2007

(65) Prior Publication Data
US 2010/0010839 A1    Jan. 14, 2010

Related U.S. Application Data

(60) Provisional application No. 60/813,343, filed on Jun. 14, 2006.

(30) Foreign Application Priority Data

May 22, 2006   (EP) ...................................... 06300507

(51) Int. Cl.
*G06Q 10/00*   (2006.01)

(52) U.S. Cl. ......................................................... 705/5
(58) Field of Classification Search ....................... 705/5
See application file for complete search history.

(56) References Cited

U.S. PATENT DOCUMENTS
4,862,357 A * 8/1989 Ahlstrom et al. ................ 705/6
(Continued)

FOREIGN PATENT DOCUMENTS
GB    2366403 A    3/2002
WO    01/33408 A    5/2001

OTHER PUBLICATIONS

Singapore Search Report in Corresponding Application No. 200808626-6 dated May 1, 2010.

*Primary Examiner* — Shannon Campbell
(74) *Attorney, Agent, or Firm* — Young & Thompson (57) ABSTRACT

A method of evaluating outbound and inbound fare amounts out of a plurality of roundtrip fare recommendations is disclosed. Intended to be displayed in a one-way like display, roundtrip fares are first obtained from a fare-driven availability engine receiving inputs from an online user of a travel website. Further recommendations are deduced by combining the above roundtrip fare recommendations in order to obtain a first improved list of recommendations which comprises more outbound and inbound fare combinations. Then, one-way fare amounts are determined for each combination from the first improved list of recommendations. A second improved list of recommendations, comprising outbound and inbound fare amounts evaluated on the basis of the initial roundtrip fare recommendations, is generated. Outbound and inbound fare amounts can thus be shown in a one-way like display of roundtrip fares to the online user of the travel website.

19 Claims, 7 Drawing Sheets

U.S. PATENT DOCUMENTS

| | | | | |
|---|---|---|---|---|
| 6,112,185 A * | 8/2000 | Walker et al. | | 705/5 |
| 7,050,987 B2 * | 5/2006 | Lettovsky et al. | | 705/6 |
| 7,472,080 B2 * | 12/2008 | Goel | | 705/26 |
| 2002/0065688 A1 * | 5/2002 | Charlton et al. | | 705/5 |
| 2002/0143587 A1 * | 10/2002 | Champernowne | | 705/5 |
| 2006/0190276 A1 * | 8/2006 | Williamson | | 705/1 |

* cited by examiner

Prior Art

Select departing Flight — Best fares : Paris to Nice

| -3 days | Thu 12 May $92 | Fri 13 May $143 | Sat 14 May $110 | Sun 15 May $102 | Mon 16 May $110 | Tue 17 May $110 | Wed 18 May $110 | +3 days |

From : Paris (PAR)
To : Nice (NCE)

| Op. | Flight | Depart | Arrive | Aircraft | Stops |  | Std eco | Flex Eco | Liberty | Business | First |
|---|---|---|---|---|---|---|---|---|---|---|---|
| ☐ | XX1165 | 07:45 | 10:25 | 320 | 0 | - | ○$120 | ○$150 | ○$210 | ○$350 | ○$760 |
| ☐ | XX111 | 08:50 | 11:19 | SF3 | 1 | - | - | ○$152 | ○$180 | ○$320 | ○$880 |
| ☐ | XX1161 | 23:30 | 07:10 +1 day | 319 | 0 | - | ○$102 | - | - | - | - |

'-' indicates flight is sold out or not applicable

Select returning Flight — Best fares : Nice to Paris

| -3 days | Thu 19 May $92 | Fri 20 May $143 | Sat 21 May $110 | Sun 22 May $102 | Mon 23 May $110 | Tue 24 May $110 | Wed 25 May $110 | +3 days |

From : Nice (NCE)
To : Paris (PAR)

| Op. | Flight | Depart | Arrive | Aircraft | Stops |  | Std eco | Flex Eco | Liberty | Business | First |
|---|---|---|---|---|---|---|---|---|---|---|---|
| ☐ | XX1165 | 07:45 | 10:25 | 320 | 0 | - | ○$120 | ○$140 | ○$170 | ○$290 | ○$662 |
| ☐ | XX111 | 08:50 | 11:19 | 321 | 0 | - | - | ○$142 | ○$184 | ○$295 | ○$650 |
| ☐ | XX1161 | 10:30 | 12:10 | 319 | 0 | - | ○$140 | - | - | - | - |
| ☐ | XX1255 | 13:30 | 17:10 | 149 | 0 |  |  |  |  |  |  |

'-' indicates flight is sold out or not applicable

Start a new Search [Continue]

Select a round-trip Flight

| | | | | Economy (lowest price) From $618 | Economy (flexible) From $2524 | Executive (lowest) N/A | Executive (Flexible) From $5268 |

From: Paris (PAR)
To: London (LHR)

| Select | Round-trip Fare | Op. | Flight | From | To | Date | Departure | Arrival | Stops | Aircraft |
|---|---|---|---|---|---|---|---|---|---|---|
| ● | $ 890 Per person | ☐ | XX384 | Paris | London | Mar 02 | 19:55 | 07:30 +1 day | 0 | 333 |
|  |  | ☐ | XX865 | London | Paris | Mar 06 | 14:05 | 16:30 | 0 | 333 |
| ○ | $ 920 Per person | ☐ | XX384 | Paris | London | Mar 02 | 06:00 | 21:15 | 1 | SF3 |
|  |  | ☐ | XX865 | London | Paris | Mar 02 | 14:05 | 16:30 | 0 | 763 |
| ○ | $ 1100 Per person | ☐ | XX384 | Paris | London | Mar 02 | 16:00 | 06:35 +1 day | 0 | CRJ |
|  |  | ☐ | XX865 | London | Paris | Mar 02 | 14:05 | 16:30 | 0 | SF3 |

Legend : xxxxxxxxxxxxxxxxxxxxxxxxxxxxxxxxxxxxxxxxxxx

Start a new search [Continue]

▷ Select departing Flight — 201 — Best fares: Paris to London

| -3 days | Thu 12 May $92 | Fri 13 May $143 | Sat 14 May $110 | Sun 15 May $102 | Mon 16 May $110 | Tue 17 May $110 | Wed 18 May $110 | +3 days |

From: Paris (PAR)
To: London (LHR)                                                   208

| Op. | Flight | Depart | Arrive | Aircraft | Stops | | Std eco | Flex Eco | Liberty | Business | First |
|---|---|---|---|---|---|---|---|---|---|---|---|
| ☐ | XX1165 | 07:45 | 10:25 | 320 | 0 | - | ● $240 | ○ $290 | ○ $380 | ○ $480 | ○ $990 |
| ☐ | XX111 | 08:50 | 11:19 | SF3 | 1 | - | - | ○ $295 | ○ $390 | ○ $475 | ○ $980 |
| ☐ | XX1161 | 23:30 | 07:10 +1 day | — | 0 | - | ○ $280 | - | - | - | - |

209 points to $240. 203. 204.

'-' indicates flight is sold out or not applicable

▷ Select returning Flight — 202 — 207 — Best fares: London to Paris

| -3 days | Thu 19 May $92 | Fri 20 May $143 | Sat 21 May $110 | Sun 22 May $102 | Mon 23 May $110 | Tue 24 May $110 | Wed 25 May $110 | +3 days |

From: London (LHR)
To: Paris (PAR)

| Op. | Flight | Depart | Arrive | Aircraft | Stops | | Std eco | Flex Eco | Liberty | Business | First |
|---|---|---|---|---|---|---|---|---|---|---|---|
| ☐ | XX1165 | 07:45 | 10:25 | 320 | 0 | - | ○ $280 | ○ $350 | ○ $440 | ○ $680 | ○ $940 |
| ☐ | XX111 | 08:50 | 11:19 | 321 | 0 | - | - | ○ $350 | ○ $480 | ○ $650 | ○ $990 |
| ☐ | XX1161 | 10:30 | 12:10 | 319 | 0 | - | ○ $290 | - | - | - | - |
| ☐ | XX1255 | 13:30 | 17:10 | 149 | 0 | | | | | | |

206.

'-' indicates flight is sold out or not applicable

Start a new Search    [Continue]

Dependent {204, 206}

200

210 — Network — 220

ONE-WAY LIKE DISPLAY OF ROUNDTRIP FARES

FIELD OF THE INVENTION

The present invention relates generally to travel reservation systems, and more specifically to a system and method to select and purchase travel services on-line.

BACKGROUND OF THE INVENTION

Travel service providers are now all providing on-line booking services under the form of travel sites accessible on the Internet through its most spread application, i.e., the world-wide-web or Web. Customers that want to book flights, trains, rental cars and other travel-related services need only to access the appropriate travel Web sites directly, from their computer running a Web browser software application, or through a third party such as a travel agent acting on their behalf.

In the airline industry the process of selecting flights is adversely impacted by the complex fare structure put in place over years by airlines in an attempt to stay profitable in a highly competitive business. In short, those that need to be flexible, e.g., business travelers, are charged more than those that are willing to accept restrictions even though both types of travelers eventually may share seats of the same plane cabin. Hence, low fares often have requirements like advance purchase, imply a connection, or assume to have to travel at an inconvenient time of day. There is no such a thing as a single price airlines can charge for a seat while remaining profitable. Indeed, either the price would be too high and the airline would not find enough passengers to fill its planes, or planes would be full but the airline would not cover its operational expenses.

To this end, airline fare structures most often distinguish one-way fares from roundtrip fares. One-way fares are simpler since they are easily combinable. They can be considered on specific markets such that the domestic or regional markets of a national airline. However, international fares have to be compliant with international rules (advance purchase, minimum stay, seasonability). This makes one-way combinable fares not applicable for world-wide routes.

In the case of one-way fares the graphical interface that is proposed to the end-user of a travel site, i.e., the customer accessing it directly from the Web browser of its computer, or through the corresponding software application of a travel agent, is of the type as shown (100) in FIG. 1. In this particular example of a one-way display, departing (outbound) flights and returning (inbound) flights occupy respectively the upper panel (101) and lower panel (102) of the displayed page (100). Alternatively, panels may be displayed independently. All possibilities for the dates selected by the customer are listed with their corresponding fares where applicable. The chief characteristic of this kind of display is that the customer has the freedom of combining any outbound flight with any inbound flight even if they do not belong to the same fare category (104). The roundtrip fare is obviously just the sum of the two.

Many fares are published by airlines as roundtrip fares though. To attract enough passengers, and fill their planes, airlines need to have attractive fares especially for the long-distance international market. Often a round trip fare costs less than twice a one-way fare, and indeed, often less than a single one-way fare at the expense of generally having many restricted fare rules attached like being non-refundable. Many different displays are in use depending on the airline considered. A typical roundtrip display (110) is also shown in FIG. 1. With this second kind of display, irrespective of differences that inevitably exist between what is displayed on the Web sites of different travel service providers, the customer is bound to perform a choice from a list of options built by the travel site in response to the particular request he/she has issued. Request includes information such as the leaving and returning dates, the destination, and so on. Then, customer must scroll the list of proposed returned options to select the one he/she prefers. Clearly, outbound and inbound parts are not combinable options as with the one-way display.

It is thus the object of the invention to provide a display that retains, for the customers, the freedom of choice of the one-way display while allowing the use of roundtrip fares. The invention discloses a user interface and a method that enables such a display to be operated from a travel service provider Web site.

Further objects, features and advantages of the present invention will become apparent to the ones skilled in the art upon examination of the following description in reference to the accompanying drawings. It is intended that any additional advantages be incorporated herein.

SUMMARY OF THE INVENTION

A method of displaying outbound and inbound fare amounts out of a plurality of roundtrip fare recommendations is disclosed. Intended to be displayed in a one-way like display, roundtrip fares are preferably first obtained from a fare-driven availability engine receiving inputs from an online user of a travel website. Further recommendations are deduced by combining the above roundtrip fare recommendations in order to obtain a first improved list of recommendations which comprises more outbound and inbound fare combinations. Then, one-way fare amounts are determined for each combination from the first improved list of recommendations. A second improved list of recommendations, comprising outbound and inbound fare amounts evaluated on the basis of the initial roundtrip fare recommendations, is generated. Outbound and inbound fare amounts can thus be shown in a one-way like display of roundtrip fares to the online user of the travel website.

A user interface including a first and a second panel to respectively display outbound and inbound parts of roundtrip fares is also described. Contents displayed in first and second panel are made dependent of each other. A different user selection done in first panel or in second panel modifies accordingly what is respectively displayed in second panel or in first panel.

Also disclosed is the method of assigning to the first panel the role of master panel which is thus initialized with the evaluated outbound fare amounts. The second panel is assigned the role of slave panel and is initialized with the inbound fare amounts corresponding to a default fare selection on the first panel. Each time a different fare selection is performed by the user on the master panel the slave panel is updated with those of the evaluated inbound fare amounts corresponding to the different fare selection.

Alternatively, both panels are initially assigned the role of master panels excluding the steps of initializing them. When a fare selection is performed for a first time by the user on any one of the master panels the one from where the first time selection has been performed is confirmed in the role of master panel and is initialized. The other panel is assigned the role of slave panel and is in turn initialized accordingly.

In all cases switching between master and slave roles is obtained by performing a fare selection on current slave panel.

Further disclosed is the method wherein roundtrip fares belong to defined groups of fares sharing same characteristics and wherein the groups of fares are sorted on the basis of their level of service to customers. Deducing further recommendations from the initial roundtrip fare recommendations consist in combining all pairs of those recommendations that use a same group of fares for their outbound and inbound flights. More combinations are obtained by combining two or more recommendations having some groups of fares in common for their outbound and inbound flights. In which cases one-way fare amounts are worth half of their respective roundtrip fare amounts. And, once outbound or inbound fare amounts have been established, corresponding inbound or outbound fare amounts are worth the difference with their respective roundtrip fares.

Method and user interface of the invention also include the possibility of upselling roundtrip fares on a one-way basis.

BRIEF DESCRIPTION OF THE DRAWINGS

FIG. 1 shows one-way and roundtrip displays of prior art.

FIG. 3, which is comprised of FIGS. 3a and 3b, shows the steps of the method for evaluating and displaying outbound and inbound fare amounts from roundtrip fares.

FIG. 4, which is comprised of FIGS. 4a, 4b and 4c, discusses upselling of roundtrip fares on a one-way basis made possible with the use of the invention.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 2:
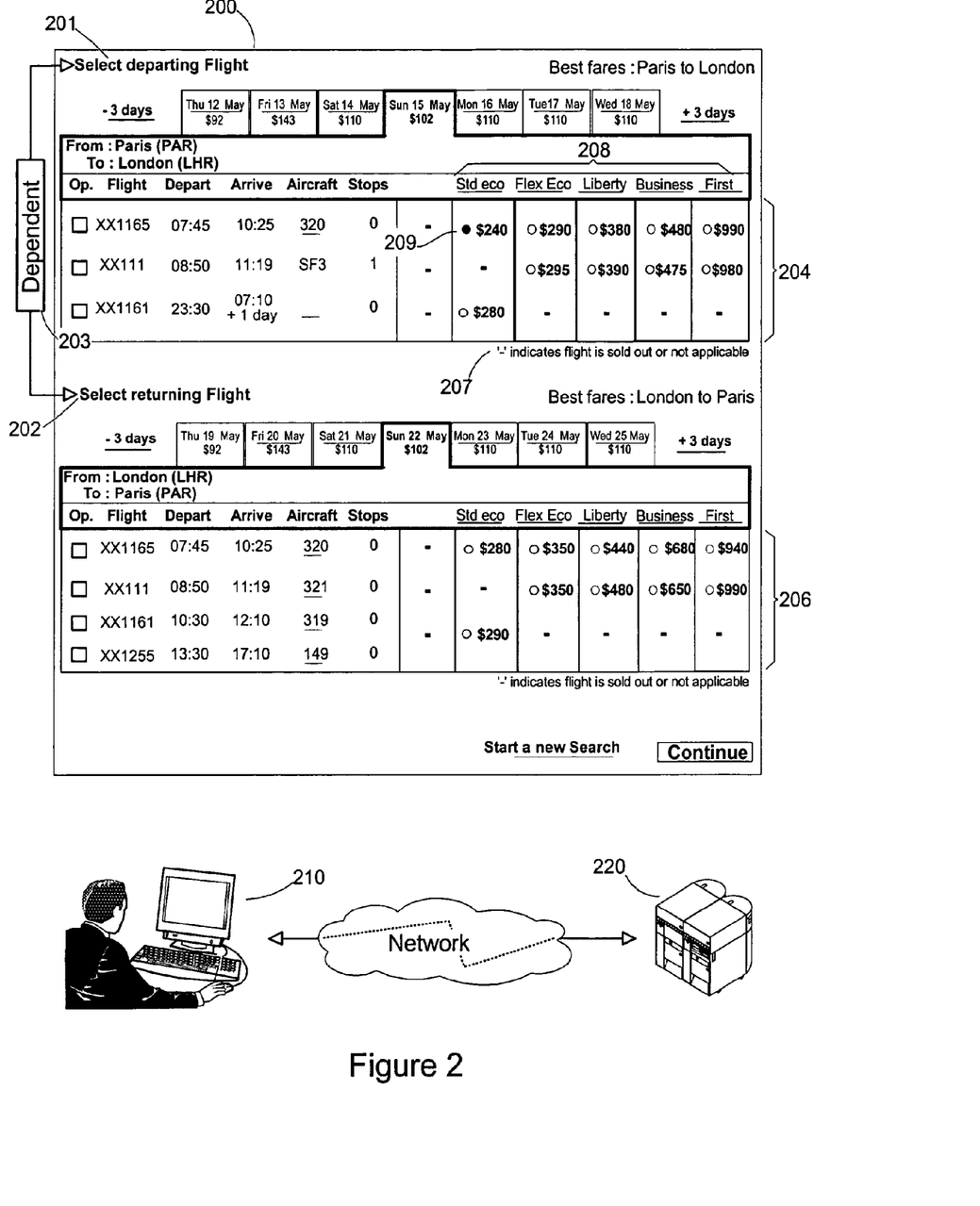
FIG. 2 shows a one-way like display for roundtrip fares according to the invention.

FIG. 2 shows a one-way like display for roundtrip fares (200) according to the invention. In the present description the terms "display of fares" and "display of travel propositions with fare amounts" are equivalently used. It appears on the monitor (210) of an end-user accessing the Web site of a travel service provider (220) through a network, generally, the Internet.

Although, display (200) looks like the one-way display of prior art (100) for markets using one-way combinable fares, a significant difference is that the upper panel (201) and lower panel (202) of the display are no longer independent (203). The choices offered to user in one direction (inbound or outbound flights) depend on selections made in the other direction. Because of this, the two panels are preferably displayed, as shown, in the same page (200). Alternatively, the two panels may be however displayed on two independent pages. This second approach offers the advantage of hiding the dynamic changes that possibly occur when selection changes are made by user in one panel.

Figure 3A:
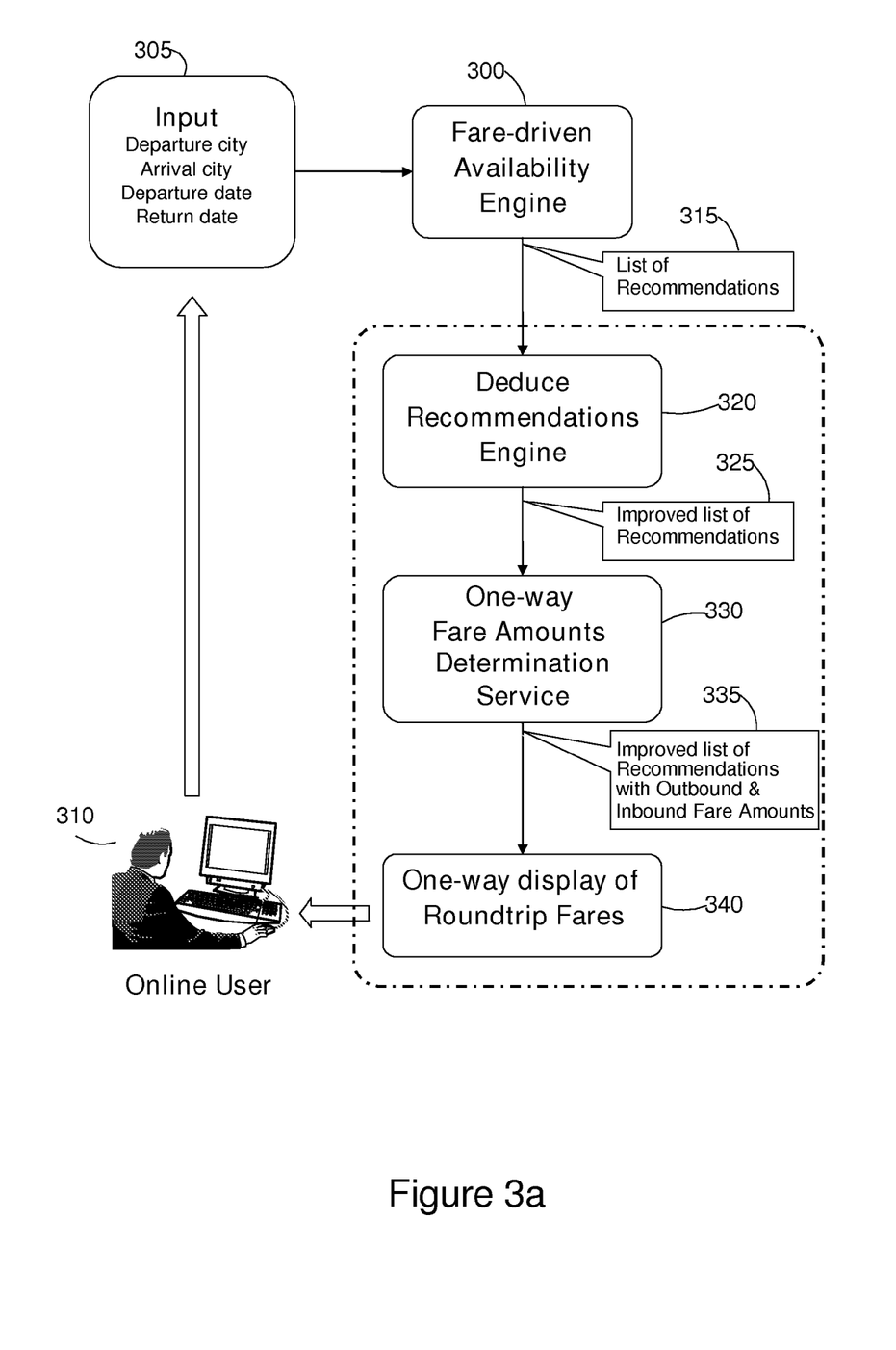
Figure 3B:
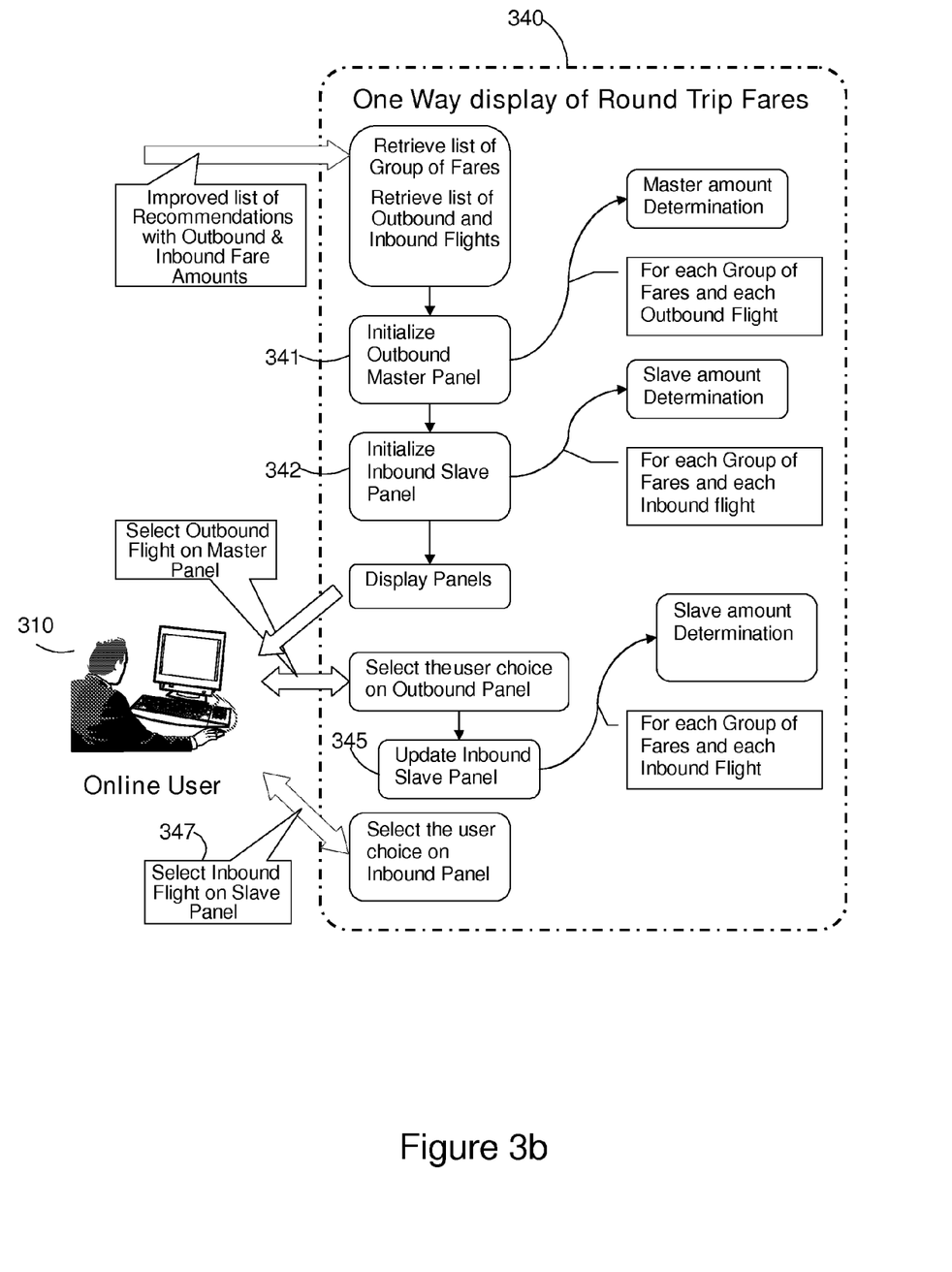

As it is further discussed in FIGS. 3a and 3b one of the panels plays the role of master panel while the second one is the slave. The slave panel changes according to the user selections, e.g.: (209), on the master. The selection can be made by the user using input means. For example pointing means can be implemented to activate or deactivate a button assigned to each element of the list of propositions with fare amounts. The fare amounts displayed on the master panel, e.g., the upper panel (204) for each listed recommendation is determined as explained in FIG. 3a. Then, the fare amounts displayed on the slave panel (206) depend on the selection done on the master panel. In short, slave fare amounts are the differences between the total roundtrip fare amounts and the amount selected on the master panel (208).

Thus, one-way like display of roundtrip fares (200) greatly simplifies the way customer can perform a choice. For example, users do not have to choose flight classes prior to the current page. Also, users may compare fares of different flight classes on a same page. Hence, as with the standard one-way display, users may choose inbound and outbound flights independently. Especially, if they are combinable, two different flight classes for inbound and outbound flights can be picked.

FIG. 3, which is comprised of FIGS. 3a and 3b, is an overall description of how the dependent panels for outbound and inbound flights of the one-way like display of roundtrip fares are managed according to the invention.

To support a display according to the invention the use of a 'fare-driven availability engine' (300) of the kind developed for airline direct distribution Web site is assumed. Its purpose is to propose a set of roundtrip fares to the customer (i.e., the cheapest per group of fares) corresponding to the requested level of service. As shown in FIG. 3a, this availability engine uses inputs (305) provided by the user (310) of this software application, i.e., the customer or any third party on his/her behalf such as a travel agent. Inputs include: the departure city, the arrival city, the departure date and the return date. Then, the fare-driven availability engine (300) returns a list of recommendations (315) that match the user request. A recommendation associates a journey with a price. The recommendations returned by the availability engine belong to different groups of fares. Groups of fares that share the same characteristics are defined by airlines. Each group corresponds to one global level of service offered to the customers. All fares from a same group of fares may be combined with each other. A level is attributed to each group of fares so that they can be sorted on the basis of their level. Examples of groups of fares are shown on FIG. 2 where five groups are displayed (208). Called 'Std Eco', 'Flex Eco', 'Liberty', 'Business' and 'First' they are displayed in this example from left to right in increasing order of their level of service to the customer.

The list returned by the availability engine serves as inputs to a 'deduce recommendations engine' (320) aimed at maximizing the number of combinations returned by the availability engine. Indeed, this latter does not propose an exhaustive list of journey and fare combinations. To maximize the combinations offered, the 'deduce recommendations engine' makes assumptions on the fare structures. It does not have to process the recommendations to guarantee their availability since it was the purpose of the availability engine to first check this.

Hence, the main function of the engine is to deduce recommendations from existing ones in order to cover more combinations of inbound flights, outbound flights and group of fares. To this end it looks for all possible combinations first checking if each considered combination was not already covered by the availability engine itself. If not, the deduce engine create a new combination which is added to the list of recommendations first provided.

To deduce a new recommendation the engine needs to start from at least two existing recommendations, i.e.: one with the outbound flight currently considered and fare group that corresponds plus another one for the inbound flight to be associated with. This is enough to start building a new recommendation and must be followed by the determination of its pricing. Determining the one-way fare amounts of a new built recommendation requires the use of some algorithm.

Among various possibilities the 'easy deduction algorithm' uses two recommendations that match the above assumptions and that are thus easy to split in two one-way fares. A recommendation can be split in two one-way fares if it employs the same fare construction method for outbound and inbound flights. In this case it is indeed possible to know what parts of the total amount belong to the outbound and inbound flights. The amount of the deduced recommendation is then equal to the sum of the amount of the two recommendations divided by two. An example of this is shown hereafter:

---

The following set of recommendations is returned by the Fare Driven Availability Engine:
    RECOMMENDATION1 5000$
        YUL-LHR FARE=A
        LHR-YUL FARE=A
    RECOMMENDATION2 2000$
        YUL-LHR FARE=B
        LHR-YUL FARE=B
The recommendation 1 and 2 described above may be split in two as they share the same fare construction method for outbound and inbound flights.
Then, the Deduce Recommendations Engine can deduce the additional following recommendations:
    RECOMMENDATION3 3500$ (= 5000/2+2000/2)
        YUL-LHR FARE=A
        LHR-YUL FARE=B
    RECOMMENDATION4 3500$ (= 2000/2+5000/2)
        YUL-LHR FARE=B
        LHR-YUL FARE=A

---

Another algorithm, called 'pivot algorithm', uses a third recommendation to determine the fare amounts. To work this algorithm requires that the fare construction method of the third recommendation outbound flight must be the same as the outbound one of the recommendation used to build the inbound flight of the deduced recommendation. Similarly, the fare construction method of the inbound part of the third recommendation must be the same as the inbound part of the recommendation used to build the outbound of the deduced recommendation. Then, the fare amount of the deduced recommendation is equal to the sum of the fare amount of the two main recommendations minus the third recommendation fare amount. An example of this is shown hereafter:

---

The following set of recommendations is returned by the Fare Driven Availability Engine:
    RECOMMENDATION5 P5=500$
        YUL-LHR FARE=C
        LHR-YUL FARE=D
    RECOMMENDATION6 P6=1000$
        YUL-LHR FARE=E
        LHR-YUL FARE=D
    RECOMMENDATION7 P7=1500$
        YUL-LHR FARE=E
        LHR-YUL FARE=F
The recommendation 3, 4, and 5 described above may be used for the pivot method. Then, the Deduce Recommendations Engine can deduce the following Recommendations:
    RECOMMENDATION8 P8 = 1000$ (= 500 + 1500 − 1000)
        YUL-LHR FARE=C
        LHR-YUL FARE=F
The amount of the RECOMMENDATION8, P8 is determined as follows:
    P5 = C + D $\Leftrightarrow$ C = P5 − D
    P6 = E + D $\Leftrightarrow$ E + D = P6
    P7 = E + F $\Leftrightarrow$ F = P7 − E -continued     P8 = C + F
    $\Leftrightarrow$ P8 = P5 − D + P7 − E
    $\Leftrightarrow$ P8 = P5 + P7 − (E + D)
    $\Leftrightarrow$ P8 = P5 + P7 − P6
    $\Leftrightarrow$ P8 = 500 + 1500 − 1000
    $\Leftrightarrow$ P8 = 1000

---

The output of the 'deduce recommendations engine' thus consists of an improved (i.e., enriched) list of recommendations (325) which, in turn, serves as inputs to a 'one-way fare amounts determination service' (330). To allow a one-way display of fares the recommendations have to be split in two parts while the fare amount is only available, at this point, for the whole trip. Outbound and inbound fare amounts have to be further determined so that to be compatible with a one-way like display of the kind shown in FIG. 2. This is simply done if the same fare construction method was used for outbound and inbound flights in which case half of the current pricing recommendation is returned. An example of this is shown here after where 'FARE=A' is used by recommendation both for outbound and inbound flights:

---

Determine the outbound amount of RECOMMENDATION1
    RECOMMENDATION1 5000$
        YUL-LHR FARE=A
        LHR-YUL FARE=A
RECOMMENDATION1 uses the same fare construction for outbound & outbound, RECOMMENDATION1 Outbound amount is 5000$/2 = 2500$

---

If this is not the case an alternate way of splitting the roundtrip fare recommendation consists in finding another recommendation with the same fare construction as the current recommendation to determine the other recommendation outbound or inbound fare amount. An example of this is shown hereafter:

---

Determine the outbound amount of RECOMMENDATION2
    RECOMMENDATION2 7000$
        YUL-LHR FARE=A
        LHR-YUL FARE=B
    RECOMMENDATION1 5000$
        YUL-LHR FARE=A = 2500$
        LHR-YUL FARE=A
RECOMMENDATION2 uses the same fare construction for outbound as RECOMMENDATION1.
As RECOMMENDATION1 Outbound amount is 2500$,
RECOMMENDATION2 outbound amount is 2500$

---

Then, once the inbound or outbound part of the fare amount has been determined as in example above the other fare part is just the difference. In the example considered here, since this is the outbound fare amount that has been first established, the inbound fare amount is obtained by deducting, from the roundtrip fare considered (i.e.: Recommendation2), the just determined outbound fare to get the inbound fare amount as shown hereafter:

---

Determine the inbound amount of RECOMMENDATION2
    RECOMMENDATION2 7000$
        YUL-LHR FARE=A = 2500$
        LHR-YUL FARE=B -continued

| As RECOMMENDATION2 Outbound amount is 2500$, RECOMMENDATION2 inbound amount is 7000$ − 2500$ = 4500$ |
|---|

Finally, if none of the above can be applied, the default method of splitting roundtrip fares consists in cutting it in half so that inbound and outbound fare amounts are the same (i.e., half the roundtrip fare).

The output of the 'one-way fare amounts determination service' is thus an improved list of recommendations that includes outbound and inbound fare amounts (335). The data of the list of recommendations are downloaded on the client's side for local storage so that dynamic changes can be performed on the user interface without the need to send additional requests to the remote system including the engine. More precisely, upon a new selection 209 by the user in the list of the first panel 200, a processing step of the recommendations data is operated locally to determine an updated (i.e.: matching the selection made by the user) list of fare propositions to be displayed on the second panel 201.

The recommendations can be displayed for the user (310) in a one-way like display (340) of the kind shown in FIG. 2, thus offering to the user the freedom of choice that used to be only associated to the one-way combinable fares while allowing customers to benefit from the attractive roundtrip fares offered by airlines.

FIG. 3b further discusses the above one-way display step (340).

At initialisation the amounts displayed on the two panels are determined as follows:

The outbound panel is first defined as being the master panel (341) which implies that it will drive the amount displayed in the associated slave inbound panel. As shown in FIG. 2, on outbound panel, one column per available group of fares (208) is filled for each proposed flight segment. For each group, fares are determined as defined in the 'master amount determination' section below. If an amount is actually returned, it is displayed, e.g., with a standard selection radio button (209), otherwise a sold out indicator is shown (207). The cheapest fare is selected as the default (initial) value to be displayed and is used to drive the slave panel.

Hence, at initialization, the inbound panel (342) is defined as being the slave panel and displayed amounts depends on what is selected on the master outbound panel. As with the outbound panel, one column per available group of fares is filled for each proposed flight segment. For each group, fares are determined as defined in the 'slave amount determination' section below. Radio buttons and sold-out indicators are used in a similar way.

The slave panel is updated each time selection is changed by the user on the master panel (345).

Master Amount Determination:

The cheapest recommendation containing the proposed segment and group of fares is looked-up and the amount to display for the corresponding master inbound or outbound flight is returned. If no matching recommendation is found, the sold-out indicator is displayed instead.

The amount displayed on the master panel for each recommendation was determined at step (330) by the 'one-way fare amounts determination service' as described in FIG. 3a.

Slave Amount Determination:

The cheapest recommendation containing the proposed segment and group of fares selected on the master panel along with the one containing the proposed segment and group of fares requested on the slave panel are looked-up. If such a recommendation exists, the difference between the total recommendation pricing solution amount and the fare amount selected from the master panel is returned as the amount to be displayed on the slave panel. Else, the sold out indicator is displayed.

Alternatively, the inbound panel may play the role of master in which case the outbound panel become the slave. For example, master and slave roles may be determined only after first user selection. In which case, initially, the two panels are displayed as master panel; however, with no pre-selected fare displayed. As soon as the user does a selection on one of the two empty panels the selected panel indeed becomes the master panel and the other panel starts playing the role of slave panel. They are both updated as explained above.

To allow switching panels status from master to slave according to the user choice on the Slave panel (347), more options are displayed to user on the slave panel, when no recommendation exist containing the Proposed Segment and Group of Fares selected on the Master Panel and also containing the proposed Segment and Group of Fares requested on the Slave Panel. The cheapest Recommendation containing the Proposed Segment and Group of Fares is looked-up, if such a recommendation exist, the amount determined at step (330) by the 'one-way fare amounts determination service' as described in FIG. 3a is displayed instead of the sold-out indicator. When the user selects one of these additional options on the slave panel (347). The slave panel becomes the master panel and it is refreshed according to its new status. Any selection done on the former master panel is cancelled. It becomes the slave panel and it is refreshed according to its new status.

FIG. 4 discusses how the invention can be used, to extend the standard upselling techniques in use, to roundtrip fares when inbound and outbound flights are separately priced according to what has been described in the here above description of the invention.

Upselling is an attempt to propose to the customer other options than his/her current selection at a higher price for additional services, i.e., customer is proposed to pick up a higher travel fare than the one he/she has first selected. To this end, when the user of an online travel site according to the invention is ready to purchase the journey he/she has selected, the booking application displays a summary of it in order to complete the transaction, and simultaneously proposes an upgrade. This consists in displaying, when applicable, a higher group of fares showing the advantages and price difference associated to the proposed upgrade. Groups of fares that share the same characteristics are defined by airlines and have already been discussed in FIG. 3 and examples shown in FIG. 2 (208). As mentioned, each group corresponds to one global level of service offered to the customers and thus can be sorted on the basis of these levels of service to the customer.

However, contrary to previous art, upselling of roundtrip fares can then be done independently for inbound and outbound flights thus adding a great deal of flexibility to the technique. Therefore, for each group of fares, on a one-way basis, one or more other groups of fares are possibly associated as upsell candidates. Displayed proposed upsell shows the advantages of the higher group of fares over the chosen one with the fare amount difference between them. The conditions to be fulfilled to display the upsell are as follows:

At least one upsell group of fares must have been actually associated to the one that has been selected by the customer.

The chosen flights of the upsell group of fares must have availability left.

The price of the associated upsell group of fares has to be higher than the one chosen by the customer.

No upsell offer is thus displayed if above conditions are not met. When a fare has several possible associated upsell fares they are ordered according to their level. No upsell can be proposed if none has availability left. The first one of the sorted list having availability left is displayed.

An example of this is shown hereafter:

An airline defines three groups of fares: Group 1, Group 2 and Group 3. The upsell candidates are defined as in table below:

| Group of Fares | Upsell candidate | Priority |
| --- | --- | --- |
| Group 1 | Group 2 | 1 |
| Group 1 | Group 3 | 2 |

If a user selects a recommendation with a fare from Group 1 for inbound and outbound flights, then upselling is proposed to Group 2 if there is availability left. Else, Group 3 is proposed. If none has availability left no upselling can be proposed.

The additional cost for the customer, or price differential of the upsell is calculated on the basis of what he/she has first selected.

In the framework of the invention, for a roundtrip itinerary, a recommendation may comprise one or two groups of fares:

When there are two groups of fares (one for outbound flight, one for inbound flight) only the lowest one is made eligible to upsell.

When a same group of fares is used for inbound and outbound flights, upselling depends on the combinability between the selected groups of fares and the upsell candidate:

If the selected group of fares and the upsell candidate are combinable, the user will be proposed to upgrade any combination of inbound and/or outbound flights.

If they are not combinable, the user will only be proposed to upsell inbound and outbound flights together.

Figure 4A:
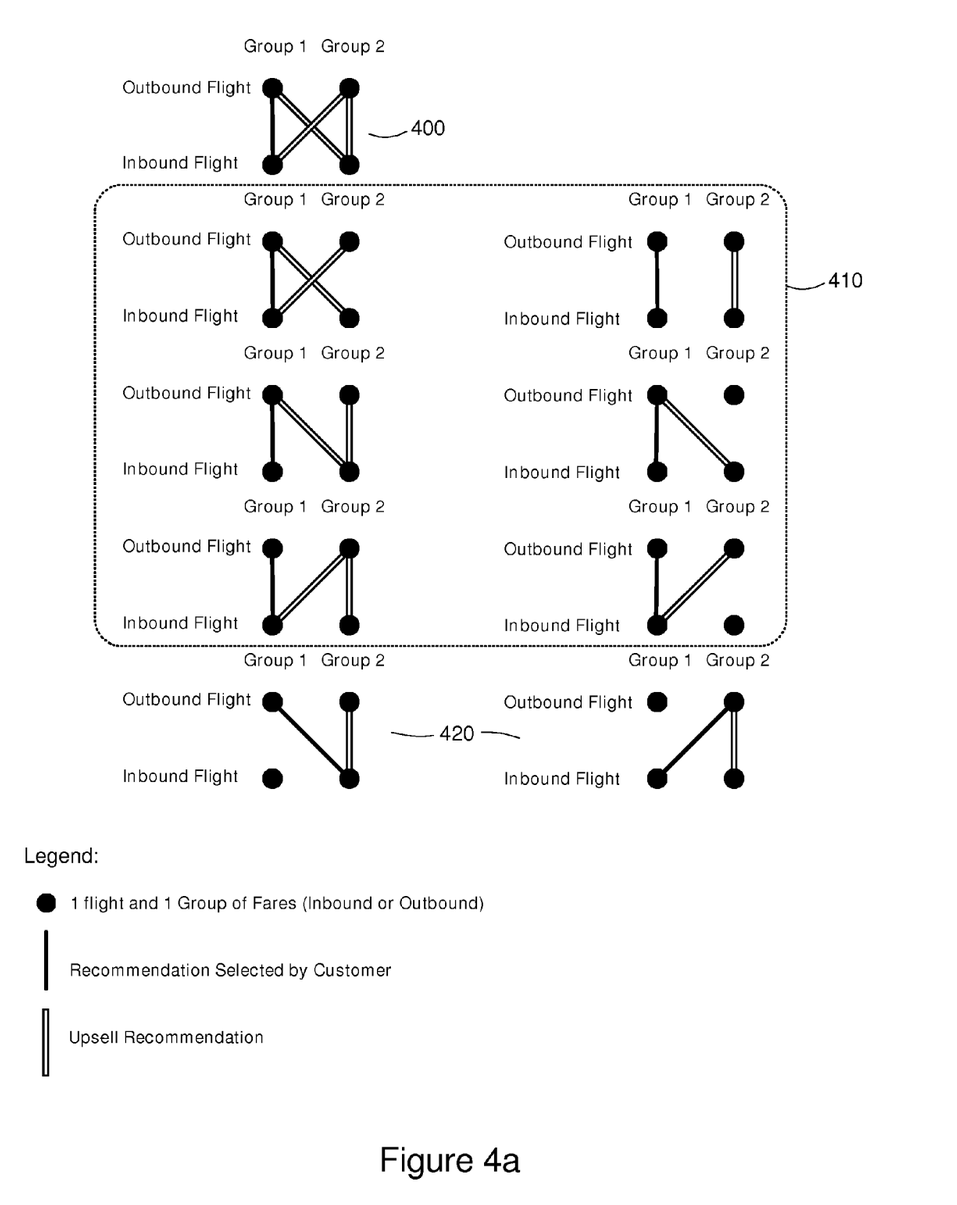

The various above combinations are illustrated in FIG. 4a when one upsell candidate is defined for fares of Group 1. The more general case (400) is when upselling can be proposed for any combination of inbound and/or outbound flights because they have indeed all availability left and groups of fares are combinable. The other more restrictive combinations are also shown (410). And, as mentioned above, when user has already combined two groups of fares in his/her selection, only the lowest one is made eligible to upselling (420).

As discussed previously in FIGS. 2 and 3, inbound and outbound parts of a recommendation, with the one-way like display according to the invention, are not independent though. This implies that when upselling is done exclusively on an inbound flight or an outbound flight the unchanged flight may not be kept as first proposed to the user. When applicable, another recommendation is rather proposed for the inbound or outbound flight that is unchanged if it best fits the upsell recommendation. Also, it is worth noting that upsell candidates are taken from the list of recommendations discussed in FIG. 3 so that availability and prices are already known. There is nothing else to retrieve to display the upsell propositions.

Figure 4B:
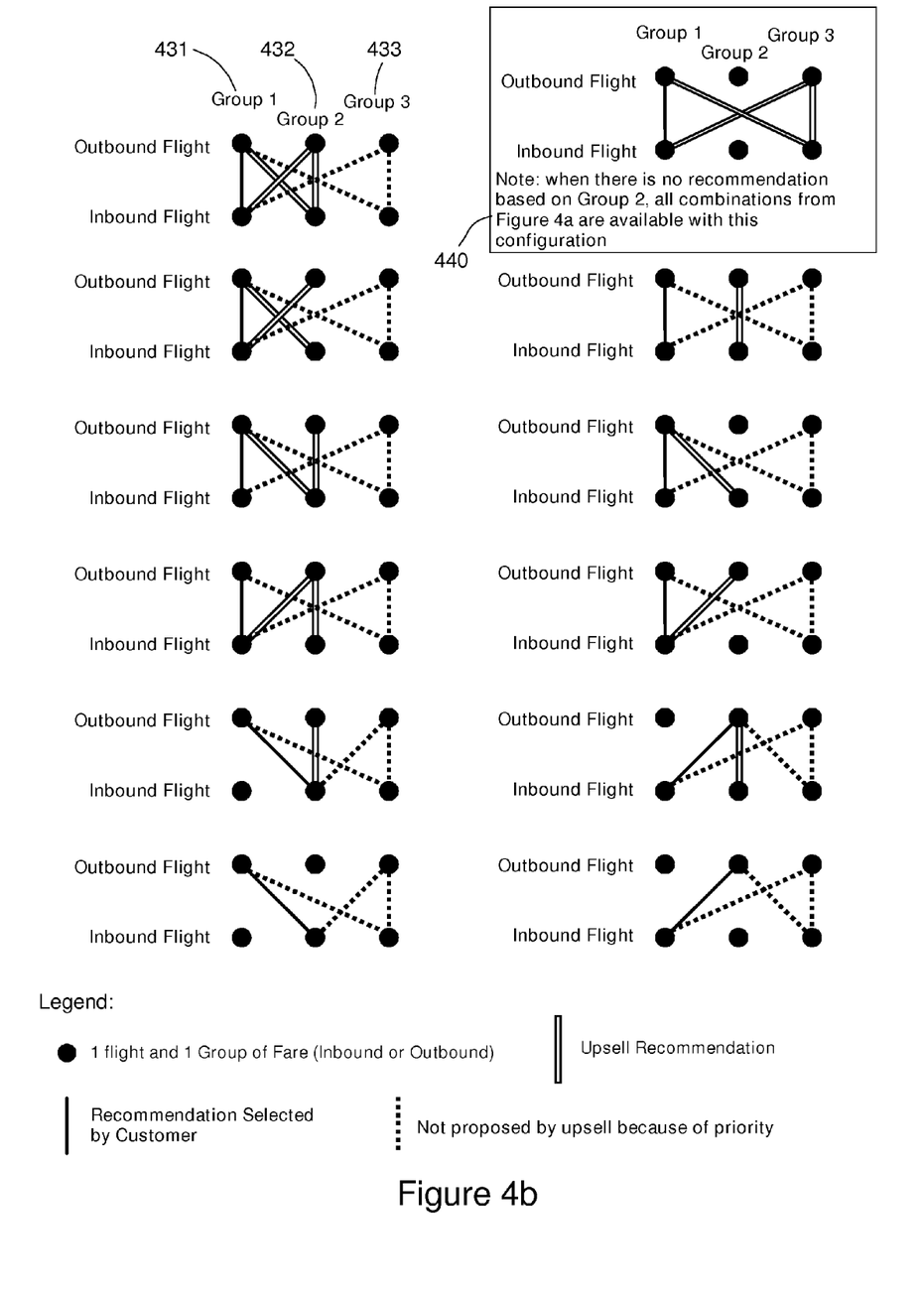

FIG. 4b illustrates the possible upsell combinations when two upsell candidates have been determined for a group of fares, i.e., the Group 1 (431) in this example. The upsell propositions of Group 3 (433), i.e., those that correspond to the dashed lines, have a lower priority versus those of Group 2 (432). Thus, they are only considered when none of Group 2 is available (440).

The price of the upgrading, if the upsell is accepted, is simply obtained by subtracting the price of the selected recommendation from the price of the candidate recommendation. Selecting an upsell should return a higher price and result of the subtraction is normally positive. However, if the result were negative, the airline may choose not to propose the upsell as it means that the user would get more services at a cheaper price. If, as normally expected, the result is positive, this value represents the additional or differential price of the upsell.

Figure 4C:
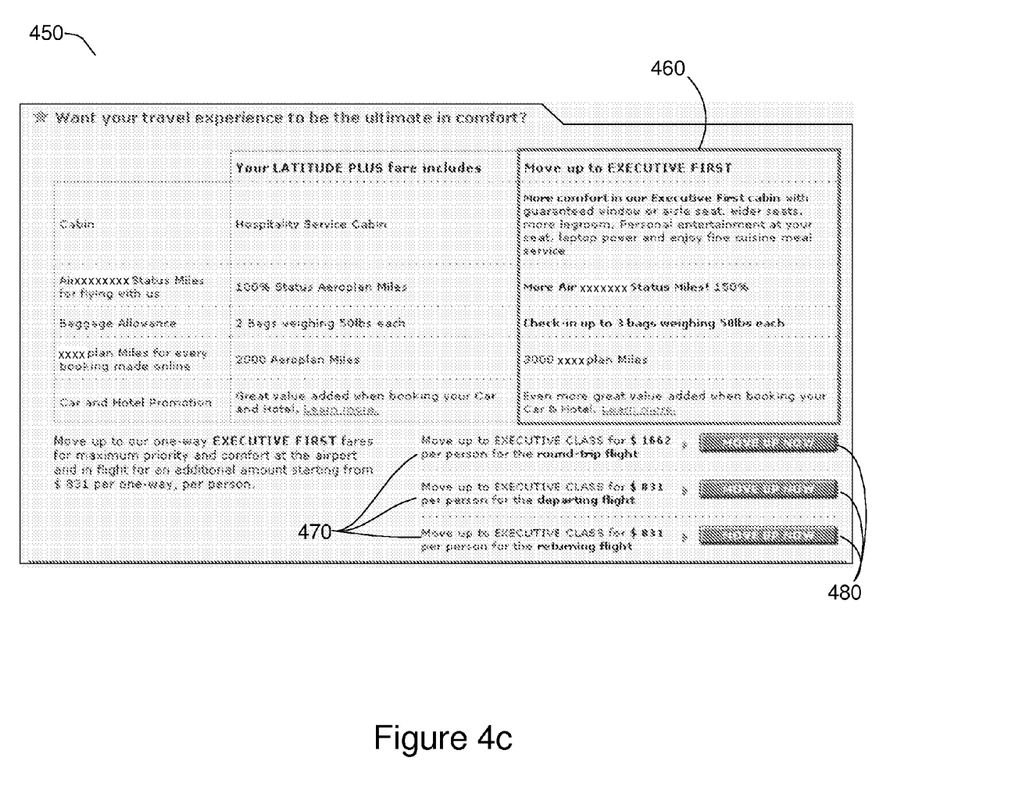

FIG. 4c is an example of a Web page (450) proposing upselling (460) options on a one-way basis as this is made possible with the use of the invention. Upselling of inbound flight, outbound flight or both (470) can thus be proposed independently and their corresponding differential prices displayed allowing users to optionally select (480) any combination they prefer.

What is claimed is:

1. A method for a one-way like display of roundtrip travel fares on a monitor of a user, comprising the steps of displaying a list of outbound propositions with fare amounts in a first panel and of displaying a list of inbound propositions with fare amounts in a second panel, comprising:

making dependent of each other contents displayed in said first panel and of said second panel;

selecting one proposition with fare amount within one of said first and second panels;

modifying the list of propositions displayed in the other of said first and second panels depending on the selected proposition;

determining the list of outbound propositions with fare amounts, the step of determining comprising the steps of:

(i) obtaining a plurality of roundtrip fare recommendations each comprising an association of an outbound proposition with an inbound proposition, (ii) deducing further roundtrip fare recommendations each associating an outbound proposition of one of the plurality of roundtrip fare recommendations with an inbound proposition of another recommendation of the plurality of roundtrip fare recommendations, (iii) generating an improved list of recommendations by association of the plurality of roundtrip fare recommendations with the further roundtrip fare recommendations, (iv) calculating a fare amount for the outbound proposition and a fare amount for the inbound proposition for each recommendation of the improved list of recommendations; and wherein:

the step of calculating comprises determining a roundtrip fare amount for each of recommendation of the improved list of recommendations;

the roundtrip fare amount of each recommendation of the plurality of roundtrip fare recommendations is determined by, a fare driven availability engine;

the roundtrip fare amount of each recommendation of the further roundtrip fare recommendations is deduced from roundtrip fare amount of at least one of the plurality of roundtrip fare recommendations; and, further comprising the step of deducing the roundtrip fare amount of a recommendation of the further roundtrip fare recommendations which comprises a first fare construction applicable to the outbound proposition and a second fare construction differing from the first fare construction and applicable to the inbound proposition, the step of deducing including setting the roundtrip fare amount of said recommendation as the half of the sum of:
(i) the roundtrip fare amount of a recommendation of the plurality of roundtrip fare recommendations for which the fare constructions applicable to the outbound proposition and to the inbound proposition are both identical to the first fare construction,
(ii) the roundtrip fare amount of a recommendation of the plurality of roundtrip fare recommendations for which the fare constructions applicable to the outbound proposition and to the inbound proposition are both identical to the second fare construction.

2. The method of claim 1 further including the steps:
assigning to said first panel the role of master panel, said assigning step including the further step of: initializing said first panel with outbound propositions with fare amounts;
assigning to said second panel the role of slave panel, said assigning step including the further steps of: initializing said second panel with inbound propositions with fare amounts corresponding to a default proposition selection on said first panel.

3. The method according to claim 2 including, upon a different selection performed by said user on said master panel, the further step of:
updating said slave panel with inbound propositions with fare amounts corresponding to said different proposition selection.

4. The method according to claim 2 wherein the assigning steps are replaced by the single step of:
Assigning to both said first panel and said second panel the role of master panels excluding the steps of initializing said first panel and said second panel.

5. The method according to claim 4 including, when a fare selection is performed for a first time by said user on any one of said master panels, the further steps of:
confirming to panel from where said first time selection has been performed the role of master panel, said confirming step including the further step of: initializing said master panel;
assigning to panel from where said first time selection has not been performed the role of slave panel including the further step of: initializing said slave panel accordingly.

6. The method according to claim 2 wherein switching between master and slave roles is obtained by performing a fare selection on current slave panel.

7. The method of claim 1, further comprising:
defining groups of fare constructions sharing same characteristics;
displaying plural lists of outbound propositions with fare amounts, each of said lists including fare amounts only applicable to one group of fares; and
displaying plural lists of inbound propositions with fare amounts, each of said lists including fare amounts only applicable to one group of fares,
wherein said groups of fares are sorted on the basis of their level of service to customers.

8. The method of claim 1 wherein upsell candidates are defined for all said groups of fares that are upgradeable.

9. The method of claim 8 wherein more than one said upsell candidate are defined further including the step of: prioritizing said upsell candidates.

10. The method of claim 9 further including, once said user has chosen a roundtrip fare recommendation, the step of:
displaying an upsell page destined for said user, said displaying step comprising the further steps of: displaying a plurality of upsell options including one-way upsell options; and, enabling an optional independent selection of said upsell options by said user.

11. The method of claim 10 wherein the step of displaying a plurality of upsell options consists in displaying only those of said upsell candidate combinations that are combinable with said user choice and have availability left.

12. The method of claim 11 wherein lower priority upsell candidates are only displayed when none of higher priority is available.

13. A computer program product stored on a computer readable storage medium, comprising computer readable code means for causing at least one computer to operate the method according to claim 1.

14. The method of claim 1, wherein the step of calculating comprises, for a recommendation of the improved list of recommendations, setting a fare amount for the outbound proposition and a fare amount for the inbound proposition each as the half of the roundtrip fare amount upon the recommendation comprising identical fare constructions applicable to the outbound proposition and to the in bound proposition.

15. The method of claim 1, wherein the step of calculating comprises, for a recommendation of the improved list of recommendations, upon said recommendation not having the same fare constructions applicable to the outbound proposition and to the inbound proposition:
determining the fare amount of a first of the outbound proposition and in bound proposition as the half of the roundtrip fare amount of another recommendation for which the fare constructions applicable to the outbound proposition and to the inbound proposition are both identical to the fare construction applicable to said first of the outbound proposition and inbound proposition;
determining the fare amount of a second of the outbound proposition and inbound proposition as the difference between the roundtrip fare amount of the recommendation and the fare amount determined for the first of the outbound proposition and inbound proposition.

16. The method of claim 1, wherein the step of calculating comprises, by default, for a recommendation of the improved list of recommendations, setting a fare amount of the outbound proposition and a fare amount for the inbound proposition each as the half of the roundtrip fare amount.

17. A method for a one-way like display of roundtrip travel fares on a monitor of a user, comprising the steps of displaying a list of outbound propositions with fare amounts in a first panel and of displaying a list of inbound propositions with fare amounts in a second panel, comprising:
determining the list of outbound propositions with fare amounts, the step of determining comprising the steps of:
(i) obtaining a plurality of roundtrip fare recommendations each comprising an association of an outbound proposition with an inbound proposition,
(ii) deducing further roundtrip fare recommendations each associating an outbound proposition of one of the plurality of roundtrip fare recommendations with an inbound proposition of another recommendation of the plurality of roundtrip fare recommendations,
(iii) generating an improved list of recommendations by association of the plurality of roundtrip fare recommendations with the further roundtrip fare recommendations, (iv) calculating a fare amount for the outbound proposition and a fare amount for the inbound proposition for each recommendation of the improved list of recommendations; and wherein:
the step of calculating comprises determining a roundtrip fare amount for each of recommendation of the improved list of recommendations;
the roundtrip fare amount of each recommendation of the plurality of roundtrip fare recommendations is determined by, a fare driven availability engine;
the roundtrip fare amount of each recommendation of the further roundtrip fare recommendations is deduced from roundtrip fare amount of at least one of the plurality of roundtrip fare recommendations; and,
further comprising the step of deducing the roundtrip fare amount of a recommendation of the further roundtrip fare recommendations which comprises a first fare construction applicable to the outbound proposition and a second fare construction differing from the first fare construction and applicable to the inbound proposition, the step of deducing including setting the roundtrip fare amount of said recommendation as the half of the sum of:
(i) the roundtrip fare amount of a recommendation of the plurality of roundtrip fare recommendations for which the fare constructions applicable to the outbound proposition and to the inbound proposition are both identical to the first fare construction,
(ii) the roundtrip fare amount of a recommendation of the plurality of roundtrip fare recommendations for which the fare constructions applicable to the outbound proposition and to the inbound proposition are both identical to the second fare construction.

18. A method for a one-way like display of roundtrip travel fares on a monitor of a user, comprising the steps of displaying a list of outbound propositions with fare amounts in a first panel and of displaying a list of inbound propositions with fare amounts in a second panel, comprising:
making dependent of each other contents displayed in said first panel and of said second panel;
selecting one proposition with fare amount within one of said first and second panels;
modifying the list of propositions displayed in the other of said first and second panels depending on the selected proposition;
determining the list of outbound propositions with fare amounts, the step of determining comprising the steps of:
(i) obtaining a plurality of roundtrip fare recommendations each comprising an association of an outbound proposition with an inbound proposition,
(ii) deducing further roundtrip fare recommendations each associating an outbound proposition of one of the plurality of roundtrip fare recommendations with an inbound proposition of another recommendation of the plurality of roundtrip fare recommendations,
(iii) generating an improved list of recommendations by association of the plurality of roundtrip fare recommendations with the further roundtrip fare recommendations,
(iv) calculating a fare amount for the outbound proposition and a fare amount for the inbound proposition for each recommendation of the improved list of recommendations; and wherein:
the step of calculating comprises determining a roundtrip fare amount for each of recommendation of the improved list of recommendations;
the roundtrip fare amount of each recommendation of the plurality of roundtrip fare recommendations is determined by, a fare driven availability engine;
the roundtrip fare amount of each recommendation of the further roundtrip fare recommendations is deduced from roundtrip fare amount of at least one of the plurality of roundtrip fare recommendations; and,
further comprising the step of deducing the roundtrip fare amount of a recommendation of the further roundtrip fare recommendations which comprises a first fare construction applicable to the outbound proposition and a second fare construction differing from the first fare construction and applicable to the inbound proposition, the step of deducing including:
(i) retrieving a roundtrip fare amount of a first recommendation of the plurality of roundtrip fare recommendations, said first recommendation comprising an outbound proposition to which the first fare construction is applicable and an inbound proposition to which a third fare construction is applicable,
(ii) retrieving a roundtrip fare amount of a second recommendation of the plurality of roundtrip fare recommendations, said first recommendation comprising an outbound proposition to which a fourth fare construction is applicable and an inbound proposition to which the third fare construction is applicable,
(iii) retrieving a roundtrip fare amount of a third recommendation of the plurality of roundtrip fare recommendations, said first recommendation comprising an outbound proposition to which the fourth fare construction is applicable and an inbound proposition to which the second fare construction is applicable,
(iv) determining the roundtrip fare amount of the recommendation of the further roundtrip fare recommendations as the sum of the roundtrip fare amount of the first recommendation and of the roundtrip fare amount of the third recommendation minus the roundtrip fare amount of the second recommendation.

19. A method for a one-way like display of roundtrip travel fares on a monitor of a user, comprising the steps of displaying a list of outbound propositions with fare amounts in a first panel and of displaying a list of inbound propositions with fare amounts in a second panel, comprising:
determining the list of outbound propositions with fare amounts, the step of determining comprising the steps of:
(i) obtaining a plurality of roundtrip fare recommendations each comprising an association of an outbound proposition with an inbound proposition,
(ii) deducing further roundtrip fare recommendations each associating an outbound proposition of one of the plurality of roundtrip fare recommendations with an inbound proposition of another recommendation of the plurality of roundtrip fare recommendations,
(iii) generating an improved list of recommendations by association of the plurality of roundtrip fare recommendations with the further roundtrip fare recommendations,
(iv) calculating a fare amount for the outbound proposition and a fare amount for the inbound proposition for each recommendation of the improved list of recommendations; and wherein:

the step of calculating comprises determining a roundtrip fare amount for each of recommendation of the improved list of recommendations;

the roundtrip fare amount of each recommendation of the plurality of roundtrip fare recommendations is determined by, a fare driven availability engine;

the roundtrip fare amount of each recommendation of the further roundtrip fare recommendations is deduced from roundtrip fare amount of at least one of the plurality of roundtrip fare recommendations; and, further comprising the step of deducing the roundtrip fare amount of a recommendation of the further roundtrip fare recommendations which comprises a first fare construction applicable to the outbound proposition and a second fare construction differing from the first fare construction and applicable to the inbound proposition, the step of deducing including:

(i) retrieving a roundtrip fare amount of a first recommendation of the plurality of roundtrip fare recommendations, said first recommendation comprising an outbound proposition to which the first fare construction is applicable and an inbound proposition to which a third fare construction is applicable, (ii) retrieving a roundtrip fare amount of a second recommendation of the plurality of roundtrip fare recommendations, said first recommendation comprising an outbound proposition to which a fourth fare construction is applicable and an inbound proposition to which the third fare construction is applicable, (iii) retrieving a roundtrip fare amount of a third recommendation of the plurality of roundtrip fare recommendations, said first recommendation comprising an outbound proposition to which the fourth fare construction is applicable and an inbound proposition to which the second fare construction is applicable, (iv) determining the roundtrip fare amount of the recommendation of the further roundtrip fare recommendations as the sum of the roundtrip fare amount of the first recommendation and of the roundtrip fare amount of the third recommendation minus the roundtrip fare amount of the second recommendation.

* * * * *